United States Patent
Johnson et al.

(10) Patent No.: US 6,594,553 B1
(45) Date of Patent: Jul. 15, 2003

(54) PROCESS FOR ENHANCING THE SULFUR CAPTURE CAPABILITY OF AN ALKALINE EARTH MATERIAL

(75) Inventors: Kurt W. Johnson, Stafford Springs, CT (US); Ferdinand A. Ruszala, Colchester, CT (US); Peter T. Stromberg, Simsbury, CT (US); Herbert E. Andrus, Jr., Granby, CT (US); James F. Durant, Bloomfield, CT (US)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/552,183

(22) Filed: Apr. 18, 2000

(51) Int. Cl.⁷ .......................... G05B 21/00; B01D 53/50
(52) U.S. Cl. ...................... 700/273; 700/266; 423/539
(58) Field of Search ................................ 700/266, 273; 423/511, 539, 540; 502/55, 438

(56) References Cited

U.S. PATENT DOCUMENTS

| | | | |
|---|---|---|---|
| 3,989,465 A | 11/1976 | Onnen | 23/260 |
| 4,588,568 A | 5/1986 | Pollmann et al. | 423/244 |
| 4,668,489 A | 5/1987 | Alexander et al. | 423/240 |
| 5,034,204 A * | 7/1991 | Moser et al. | 423/243 |
| 5,686,053 A | 11/1997 | Kikkawa et al. | 423/243.01 |
| 5,993,640 A | 11/1999 | Risse | 205/782 |
| 6,029,100 A * | 2/2000 | Iwashita et al. | 700/266 |
| 6,041,272 A * | 3/2000 | Michiki et al. | 700/266 |

FOREIGN PATENT DOCUMENTS

EP  0 554 691  8/1993

* cited by examiner

Primary Examiner—Paul P. Gordon
(74) Attorney, Agent, or Firm—Russell W. Warnock

(57) ABSTRACT

The present invention provides, according to one aspect thereof, a computer controlled process for reducing $SO_2$ from a flue gas. The process includes the basic steps of providing an aqueous treatment solution containing an inorganic salt and a control unit for controlling the introduction of the aqueous treatment solution containing an inorganic salt and controlling the control unit in response to a computer program to effect introduction of the aqueous treatment solution into contact with alkaline earth material. Thereafter, the process includes heating the alkaline earth material in the presence of the flue gas containing $SO_2$ to remove the $SO_2$. The alkaline earth material may be limestone or dolomite. The inorganic salt is selected from the group consisting of thermally decomposable sodium compounds including sodium carbonate, sodium bicarbonate, sodium hydroxide, sodium nitrate, and sodium acetate. In selected applications of the process of the present invention, the inorganic sodium compound has a concentration of between 0.05 to 5 percent of the limestone or dolomite. In preferred applications of the method, the inorganic sodium compound has a concentration of between 0.05 to 1 percent of the limestone or dolomite.

7 Claims, 6 Drawing Sheets

PROCESS FOR ENHANCING THE SULFUR CAPTURE CAPABILITY OF AN ALKALINE EARTH MATERIAL

BACKGROUND OF THE INVENTION

The present invention relates to a process for enhancing the sulfur capture capability of an alkaline earth material.

More particularly, the present invention relates to a process for enhancing an alkaline earth material by treatment with an aqueous treatment solution containing an inorganic salt and heating the treated material in the presence of a gas containing $SO_2$ to remove the $SO_2$.

A wide variety of methods are currently employed to remove sulfur compounds from gaseous streams. Hydrogen sulfide, arising, for example, from coal gasification operations, is removed to purify reducing gases for other uses downstream, such as further chemical reaction. Sulfur oxides and hydrogen sulfides, when present, must be removed from exhaust gases to maintain environmental air quality. Sulfur oxides arise from burning carbonaceous, sulfur-bearing fuels such as coal or heavy oil. It has long been known that the calcium in limestone and the calcium and magnesium in dolomite are effective sulfur capture agents. The stone may be pre-calcined to convert the calcium or magnesium carbonate to the oxide, which reacts with sulfur compounds to produce in the first instance, calcium sulfide from hydrogen sulfide gas, or in the second instance, calcium sulfate from sulfur oxides and oxygen. Elevated temperature is generally required for the reactions in the dry state and the calcination reaction (release of $CO_2$) may take place simultaneously with the absorption reaction. Wet scrubbing methods may be used effectively to remove sulfur compounds in gases at lower temperature.

Limestone and dolomite sorbents for sulfur oxide find particular application in fluidized bed combustion, which is a technology for industrial steam generation or electrical power generation. The limestone or dolomite is used in the form of crushed granules, irregular in shape. The limestone or dolomite granules are mixed directly in the fluidized bed with sulfur containing fuel. An upward flow of air supplies oxygen for burning the fuel and fluidizing the bed. Sulfur contained in the fuel is oxidized and subsequently absorbed by the limestone in a high temperature, dry state reaction. Spent sorbent and ash are removed from the bed continuously as fresh limestone and fuel are added.

Efforts have been made to improve the reactivity of the limestone or dolomite sorbent as increased reactivity would bring cost savings in that less limestone could be used to achieve the desired sulfur reduction. However, the approaches which have been proposed heretofore have often led to unacceptably high cost increases which outweigh the cost savings of reduced limestone usage. Accordingly, the need still exists for an approach to sulfur reduction by sorbent which increases the reactivity of the sorbent in an economically acceptable manner.

SUMMARY OF THE INVENTION

The present invention provides, according to one aspect thereof, a computer controlled process for reducing $SO_2$ from a flue gas. The process includes the basic steps of providing an aqueous treatment solution containing an inorganic salt and a means for introducing the aqueous treatment solution containing an inorganic salt and controlling the introducing means in response to a computer program to effect introduction of the aqueous treatment solution into contact with an alkaline earth material. Thereafter, the process includes heating the alkaline earth material in the presence of the flue gas containing $SO_2$ to remove the $SO_2$.

According to one feature of the process of the present invention, the alkaline earth material is limestone or dolomite. According to another feature, the inorganic salt is selected from a group of thermally decomposable compounds of sodium including sodium carbonate, sodium bicarbonate, sodium hydroxide, sodium nitrate, and sodium acetate.

In selected applications of the process of the present invention, the concentration of the aqueous treatment solution is adjusted to yield a net concentration of between 0.05 to 5 percent inorganic salt in the treated limestone or dolomite.

DETAILED DESCRIPTION OF THE PREFERRED EMBODIMENT

Figure 1:
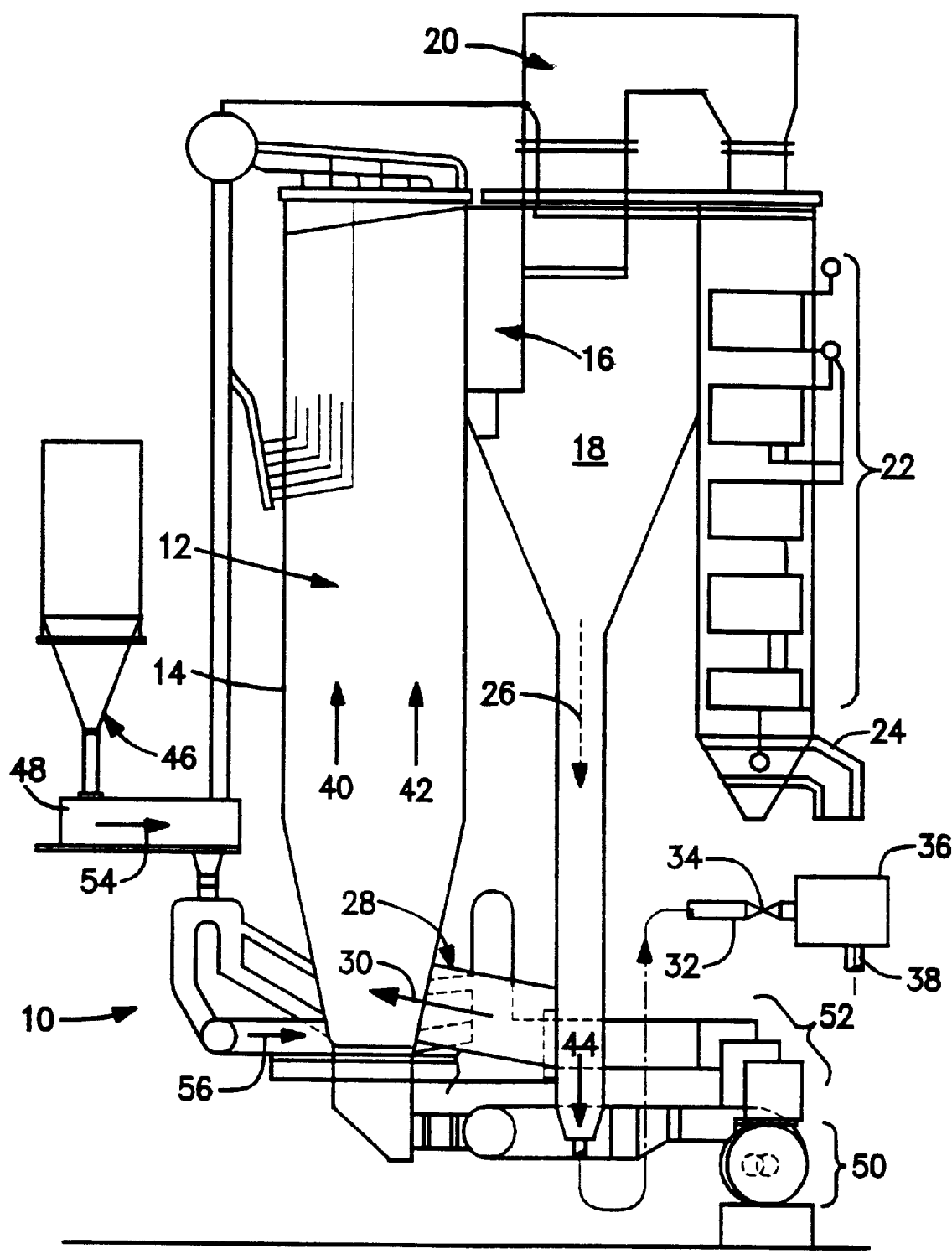
FIG. 1 is a side elevational schematic view of a circulating fluidized bed boiler which can be provided with the apparatus of the present invention and operated in accordance with the process of the present invention.

The present invention relates to a process for removing $SO_2$ by contact thereof with an alkaline earth material which has been pre-treated with an inorganic salt aqueous solution. The present invention further relates to an apparatus for implementing the $SO_2$ removal method and to a pre-treatment method and apparatus for pre-treating the alkaline earth material with an inorganic salt aqueous solution.

Although exemplary applications and embodiments of the process and apparatus of the present invention will be described shortly with respect to a circulating fluidized bed steam generator, it is to be understood that the process and apparatus may be recommended for any application in which hot products are used as reagents or as a heat and energy source and the combustion of carbonaceous fuel in that connection creates a need for $SO_2$ removal.

The sorbent treatment method of the process of the present invention broadly includes the steps of providing an alkaline earth material which has been pre-treated with an inorganic salt aqueous solution and contacting a gaseous medium having $SO_2$ with the pre-treated alkaline earth material at a temperature which effects calcination of the alkaline earth material. The alkaline earth material suitable for the present invention is any alkaline earth material which acts as a sorbent such as, for example, a calcium based sorbent such as calcium hydroxide ($Ca(OH)_2$)) or limestone ($CaCO_3$). Although the sorbent examples hereinafter will make reference to limestone as the alkaline earth material whose reactivity as a sorbent is enhanced by the method of the present invention, it is to be understood that all other suitable alkaline earth materials such as, for example, dolomite, are intended to be within the scope of the present invention as well whenever reference is had to limestone.

Limestone ($CaCO_3$) acts as a sorbent to remove $SO_2$ in accordance with a two step reaction process which occurs in the temperature regime commonly present in a carbon based fuel combustion environment. First, the limestone ($CaCO_3$) decomposes into CaO (by calcination):

$$CaCO_3(solid) \rightarrow CaO(solid) + CO_2(gas)$$

CaO then reacts with $SO_2$ in the presence of oxygen to produce $CaSO_4$ (sulfation):

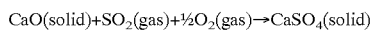

$$CaO(solid) + SO_2(gas) + \tfrac{1}{2}O_2(gas) \rightarrow CaSO_4(solid)$$

The gaseous medium may be, for example, the hot gases generated by combustion of carbon based fuel, hereinafter aggregately referred to as flue gas. The inorganic salt aqueous solution is comprised of a base composition of an inorganic salt dispersed in a fluid medium and a supplemental composition, if desired, of surfactants, evaporation accelerants, or other components which may facilitate the contact and retention of the inorganic salt in the alkaline earth material to be treated, as will be described in more detail later. The inorganic salt suitable for the base composition of the aqueous solution is any inorganic salt which will decompose upon heating at or below the calcination temperature of the alkaline earth material to be pre-treated and which will, upon decomposition, produce a relatively more active sorbent as compared to the same sorbent if it had not been pre-treated with an inorganic salt aqueous solution. By way of illustration only, it is noted that this group of thermally decomposable sodium compounds having the properties just defined includes sodium carbonate, sodium bicarbonate, sodium hydroxide, sodium nitrate, and sodium acetate.

The base composition of the inorganic salt aqueous solution is formed by effecting a dispersion of the inorganic salt in the fluid medium. The fluid medium may be water or a water mixture and may comprise dissolved or suspended solids as well to the extent that the fluid medium is still capable of effecting a desired distribution of the inorganic salt into and on the alkaline earth material to be pre-treated.

The concentration of the inorganic salt in the fluid medium may be governed as desired by, for example, considerations of solubility, capability of the aqueous solution, or temperature. However, it is preferred that the concentration of the inorganic salt in the fluid medium be such that the subsequent inorganic salt retention within and on the alkaline earth material which is pre-treated by contact with the aqueous solution optimizes the sulfur capture capability of the thus treated alkaline earth material.

Experiments by the applicants have revealed that the sulfur capture capability of several crystalline limestones ($CaCO_3$) can be improved by pre-treatment of such limestone in an aqueous solution having a concentration of 5% sodium carbonate (Na2CO3) with a resulting sodium (Na) retention in the limestone (prior to calcination) of approximately 0.1% sodium (Na) while the same 5% sodium carbonate concentration in the aqueous solution has yielded a resulting sodium (Na) retention of 0.4% in a relatively much more porous limestone.

Without excluding other approaches to implementing the method of the present invention, it is believed that the sulfur capture capability of limestone can be enhanced if the limestone is pre treated in accordance with the method of the present invention such that the limestone has a sodium retention of between about 0.05 to 5% prior to calcination. Moreover, it is believed some enhancement of the sulfur capture capability of limestone is still attainable even if the sodium retention is such that excess sodium exists after calcination which had not been incorporated into the structure of the limestone prior to its calcination. Additionally, it is contemplated that the step, in the method of the present invention, of treating the alkaline earth material with the inorganic salt aqueous solution encompasses all contact time durations which effect a suitable pre-treatment of the alkaline earth material. Thus, a relatively short contact time duration of, for example, two seconds, may effect a suitable alkaline earth material pre-treatment under one given set of temperature, concentration, and/or particle size conditions while a relatively longer contact time duration of, for example, two weeks, may effect as well a suitable alkaline earth material pre-treatment under a different given set of temperature, concentration, and/or particle size conditions.

Without wishing to be bound by any theory and without alleging a complete understanding of the mechanism by which increased sulfur capture is accomplished for an alkaline earth material pre treated in accordance with the method of the present invention, it is submitted that the creation of defects or dislocations in the crystal structure of the limestone by sodium ions may beneficiate the sulfur capture capability of the limestone. It is known that sodium ions, which have a dissimilar charge from the calcium ions comprised in the limestone crystal structure, create dislocations in the crystal structure. However, the contribution or criticality of such dislocations to the enhanced or increased sulfur capture capability of the limestone which has been pre-treated in accordance with the method of the present invention is not known.

The increased sulfur capture capability of limestone treated by the inventive method has been verified through thermogravimetric analysis (TGA) which has revealed that at least some limestones can, when treated with an optimum amount of sodium (Na), demonstrate up to a four fold increase in their sulfur capture capability as compared to their sulfur capture capability when not so pre-treated. It is to be understood that analyses other than thermogravimetric analysis (TGA) can be employed to verify the increased sulfur capture capability of the pre-treated alkaline earth material. Also, no claim is hereby made that every pre-treatment of an alkaline earth material will directly lead to an overall cost savings in each flue gas sulfur removal scenario. Instead, it is to be understood that an accurate cost appreciation of an implementation of the inventive method must balance the material and operation costs involved in pretreating the limestone, including the application of the aqueous solution and the evaporation of excess moisture on the pre-calcined limestone, with the benefits such as reduced consumption of the limestone due to its greater sulfur reactivity.

Referring now to FIG. 1 of the drawing, there is depicted therein a circulating fluidized bed steam generator (CFB), generally designated by the reference numeral 10, which, during its operation, (1) combusts a carbonaceous fuel whereby $SO_2$ is produced and (2) removes $SO_2$ with an alkaline earth material. The circulating fluidized bed system 10 and its operation will now described to illustrate and describe several model implementations of the method and apparatus of the present invention. To briefly illustrate the circulating fluidized bed system and its operation, reference is had to FIG. 1 which shows a circulating fluidized bed steam generator 10 having a furnace volume, denoted therein by the reference numeral 12, the latter being defined by waterwall tubes, denoted therein by the reference numeral 14; a first section of ductwork, denoted therein by the reference numeral 16; a gas-solids separator, denoted therein by the reference numeral 18; an intermediate section of backpass ductwork, denoted therein by the reference numeral 20; and a backpass volume, denoted therein by the reference numeral 22, from which further ductwork, denoted therein by the reference numeral 24, extends.

The furnace volume 12 is water cooled via water transported through the waterwall tubes 14 whereas the gas-solids separator 18 and the backpass volume are steam cooled via tubes integrated into their wall structures. This water-cooled furnace volume and steam-cooled gas-solids separator and backpass volume arrangement advantageously minimizes thermal differential expansion difficulties and decreases start up and cool down operational times.

The lower segment of the gas-solids separator 18 is connected in fluid flow relation with the lower segment of the furnace volume 12 through a fluid flow system consisting of an initial collection path 26; a direct return measured feed device, denoted therein by the reference numeral 28; a direct return path, denoted therein by the reference numeral 30; a fluidized bed heat exchanger (FBHE) inlet, denoted therein by the reference numeral 32; an ash control valve, denoted therein by the reference numeral 34; a fluidized bed heat exchanger (FBHE), denoted therein by the reference numeral 36; and a fluidized bed heat exchanger (FBHE) outlet, denoted therein by the reference numeral 38. The furnace volume 12 is in communication with a storage silo of fuel and sorbent, denoted therein by the reference numeral 46, a supply line 48 which conveys fuel and sorbent from the storage silo 46 directly to the furnace volume 12, as well as with a source, denoted therein by the reference numeral 50, of air through a supply line, denoted therein by the reference numeral 52.

With regard to FIG. 1 of the drawing, it will be understood from reference thereto that in the lower segment of the furnace volume 12 a mixture of fuel and sorbent, denoted therein by the reference numeral 54, is mixed for purposes of the combustion thereof with air, denoted therein by the reference numeral 56. Fluidizing air is fed through a floor grate on which the fluidized bed of the furnace volume 12 is disposed and secondary air is fed at two levels above the floor grate.

Combustion gases, denoted therein by the reference numeral 40, are produced by the combustion operation and hot solids, denoted therein by the reference numeral 42, are entrained in the hot flue gases 40. These hot flue gases 40 with the hot solids 42 entrained therewith rise within the furnace volume 12 whereupon, at the top of the furnace volume 12, the hot flue gases 40 with the hot solids 42 entrained therewith are made to flow through the duct 16 to the gas-solids separator 18. Within the gas-solids separator 18, the hot solids 42 that are made to flow thereto, which are above a predetermined size, are separated from the hot flue gases 40 in which they are entrained. The separated hot solids 42 which contain unburned fuel, flyash and sorbent flow through the gas-solids separator 18. From the gas-solids separator 18, the hot solids 42 are discharged under the influence of gravity into the initial collection path 26, from whence a portion of the hot solids 42 flow through the initial collection path 26 to and through the direct return measured feed device 28. Thereafter, from the direct return measured feed device 28, this portion of the hot solids 42 is reintroduced by means of a corresponding direct return path 30 into the lower segment of the furnace volume 12 whereupon this portion of the hot solids 42 is once again subjected to the combustion process that takes place in the circulating fluidized bed steam generator (CFB) 10. The remainder of the hot solids 42 which are above predetermined size, denoted as heat exchanger hot solids 44, are diverted from the gas-solids separator 18 to the fluidized bed heat exchanger (FBHE) 36 by way of the heat exchanger inlet 32 and thence to the lower segment of the furnace volume 12 via a corresponding heat exchanger outlet 38.

Continuing, on the other hand, the hot flue gases 40 leaving the gas-solids separator 18, hereinafter referred to as flue gases, are directed from the gas-solids separator 18 via the intermediate backpass ductwork 20 to the backpass volume 22, where additional heat transfer duty is performed. From the backpass volume 22, the now somewhat cooled flue gases 40 exit through the ductwork 24 to a particulate removal system (not shown in the interest of maintaining clarity of illustration in the drawings) whereupon the flue gases 40 are discharged to the atmosphere through a stack (not shown in the interest of maintaining clarity of illustration in the drawings). Alternatively, the flue gases 40 exiting the backpass volume 22 may be directed to another component of an overall combined cycle arrangement such as, for example, a turbine for providing motive power thereto.

Figure 2:
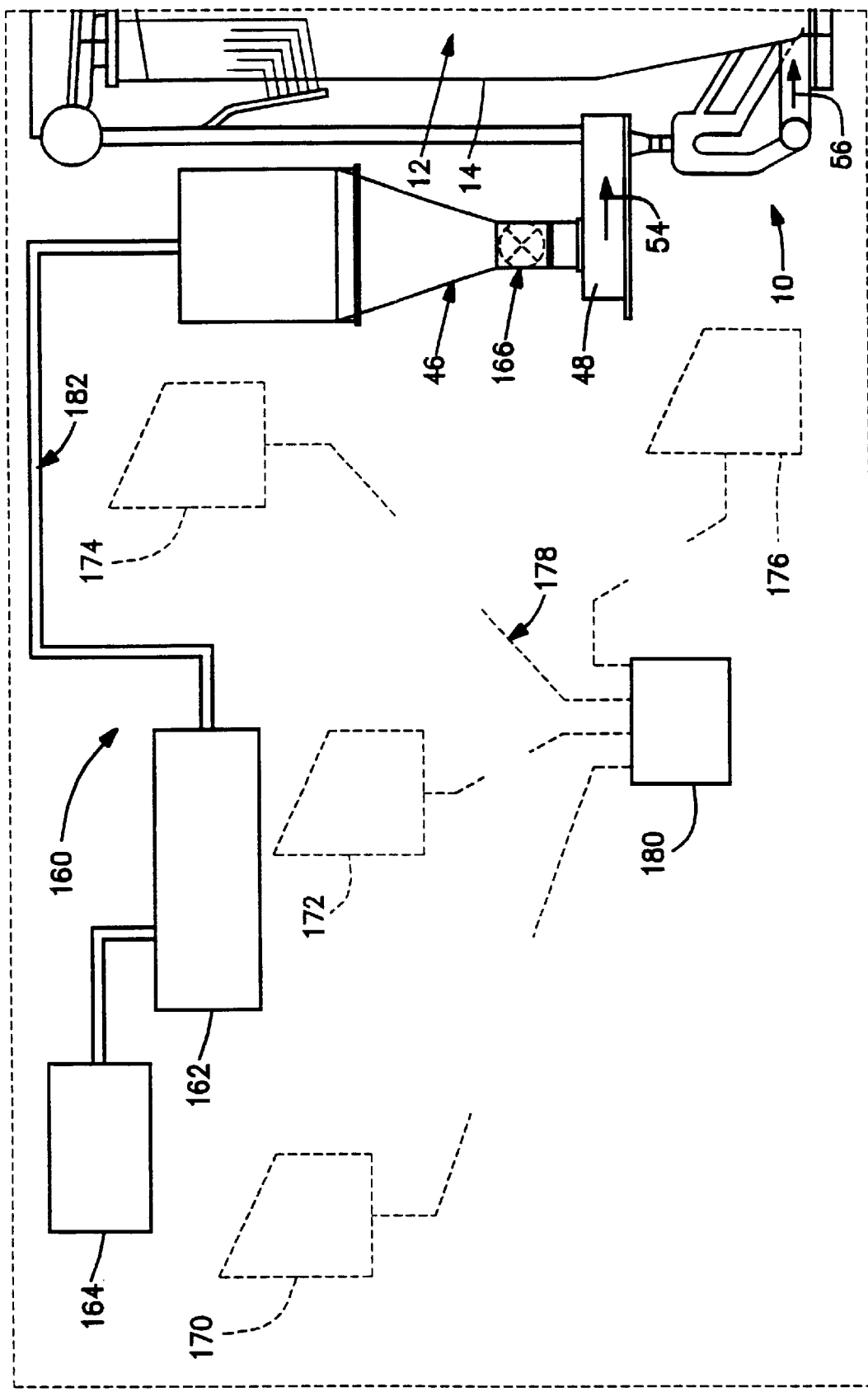
FIG. 2 is a side elevational schematic view of the left hand portion of a circulating fluidized bed boiler shown in FIG. 1 and showing a sorbent delivery system provided with the apparatus of the present invention and operated in accordance with the process of the present invention.

Reference it now had to FIG. 2 which is a schematic illustration of a first variation of the sorbent and fuel feed system of the present invention, generally designated as sorbent-fuel delivery system 160. The sorbent-fuel delivery system 160 includes a crusher 162 for receiving raw limestone from a limestone source 164 and crushes the raw limestone into particles of a predetermined size. The crushed limestone particles are conveyed to the storage silo 46 having a feed control 166 for controlling the feed of crushed limestone particles to the supply line 48 which thereafter transports the particles into the generator 10.

Pre-treatment of the limestone can be accomplished at four different locations to the limestone along the various limestone handling locations of the silo 160 and these locations are shown in broken lines and designated as station 170, station 172, station 174, and station 176. Each station 170, 172, 174, and 176 is operable to effect pre-treatment of the limestone in accordance with the method of the present invention. It is to be understood that, as desired, pre-treatment of the limestone can be accomplished at a single station, more than one station but less than all stations, or at all stations. Each station 170, 172, 174, and 176 is connected, via a connector 178, to a control unit 180 for controlling the introduction of the inventive aqueous solution onto the limestone for pre-treatment of the limestone. The control unit 180 can be configured, for example, as a personal computer (PC) based control unit operable to control the introduction of the inventive aqueous solution in response to a software program including an online or Internet supported software program.

The station 170 is disposed adjacent the limestone source 164 and is operable to introduce the inventive aqueous solution into the raw limestone transitorily stored at the limestone source 164 to thereby effect enhancement of the limestone in accordance with the method of the present invention. The station 172 is disposed adjacent the crush 162 and is operable to introduce the inventive aqueous solution into the region of the crushed limestone particles to thereby effect enhancement of the crushed limestone particles in accordance with the method of the present invention. The control unit 180 can be programmed to regulate the stations 170, 172 to individually or pairwise dispense the inventive aqueous solution into their respective adjacent limestone handling locations.

The station 174 is disposed adjacent the storage silo 46 and is operable to introduce the inventive aqueous solution into the crushed limestone particles being stored in the storage silo. The station 176 is disposed adjacent the supply line 48 and is operable to introduce the inventive aqueous solution into the crushed limestone particles immediately before the particles are fed into the generator 10. The supply line 48 may be in the form of a conventional pneumatic transport system or a conventional mechanical belt or screw conveyor.

Figure 3:
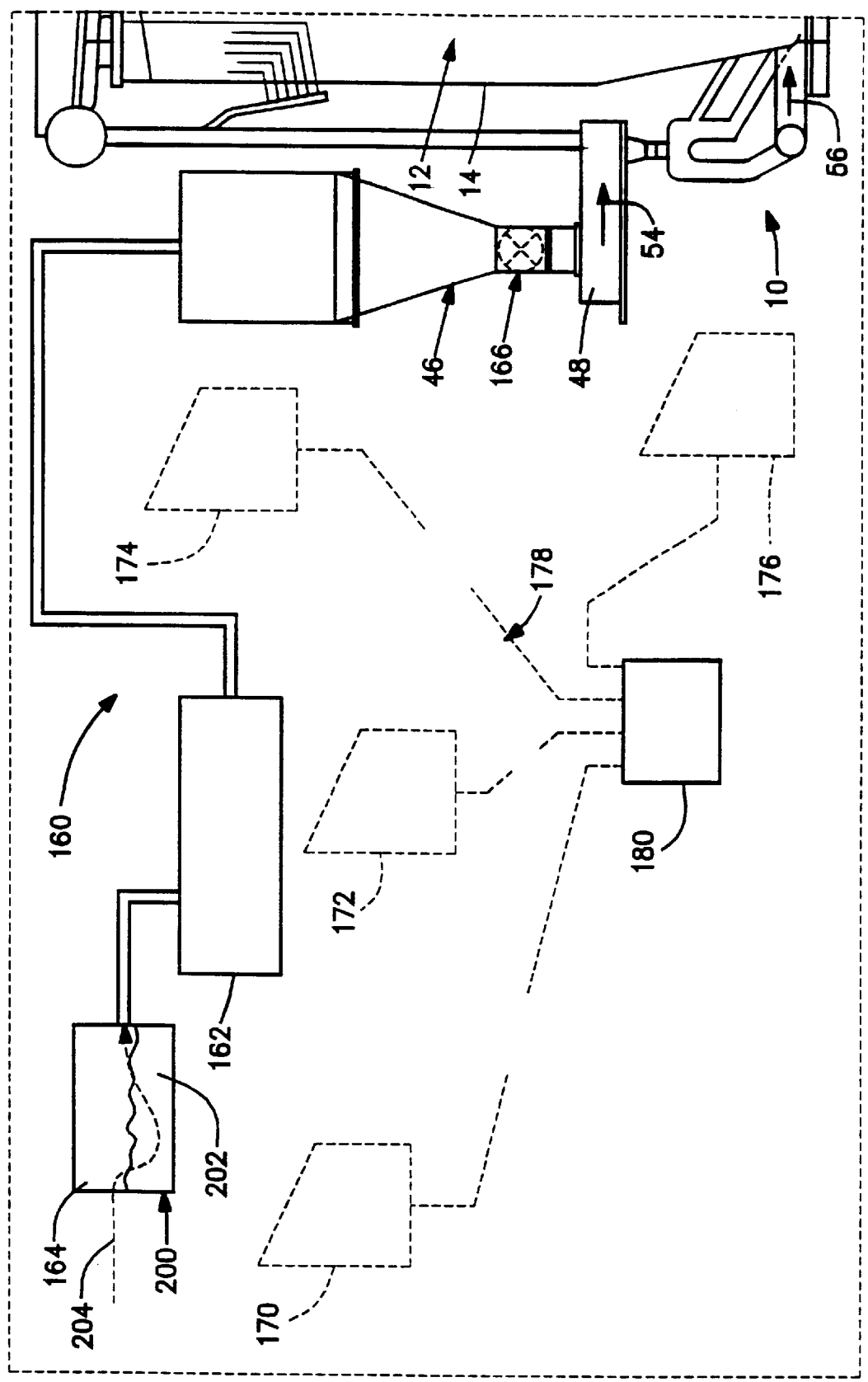
FIG. 3 is a side elevational schematic view of the left hand portion of a circulating fluidized bed boiler shown in FIG. 1 and showing one variation of the sorbent delivery system shown in FIG. 2.

FIG. 3, which is an enlarged elevational view of the source 164, illustrates one exemplary configuration of the station 170 operable to apply the inventive aqueous solution to the raw limestone at the source 164. In this configuration, the source 164 includes a tank 200 which holds an aqueous solution 202 comprised of the inorganic salt pre-treatment solution in accordance with the method of the present invention. A feed stream 204 of raw limestone or dolomite is moved through the aqueous solution 202 by any suitable conventional wet transport means such as, for example, a submerged moving belt or a cycle of bulk deposition of the raw limestone and bulk or continuous removal of the bulk deposited raw limestone. In this manner, a pre-treatment of the raw limestone is obtained such that each raw limestone particle absorbs the aqueous solution and thereafter exits the tank 200 with an excess moisture content. The excess moisture content is evaporated, absorbed, or driven off during subsequent process steps as the raw limestone is forwarded to the generator 10; for example, some or all excess moisture may be driven off during the next following process step of crushing and grinding of the raw limestone in the crusher 162.

It is to be understood that the aqueous solution 202 can be drained, filtered, and/or refreshed as needed. Also, in lieu of or in addition to the evaporative effects of the subsequent process steps on the excess moisture of the pre-treated raw limestone, heat may be applied to the pre-treated raw limestone after its immersion in the aqueous solution 202 in the form of heated ambient or process air or through contact with a heated surface.

Figure 4:
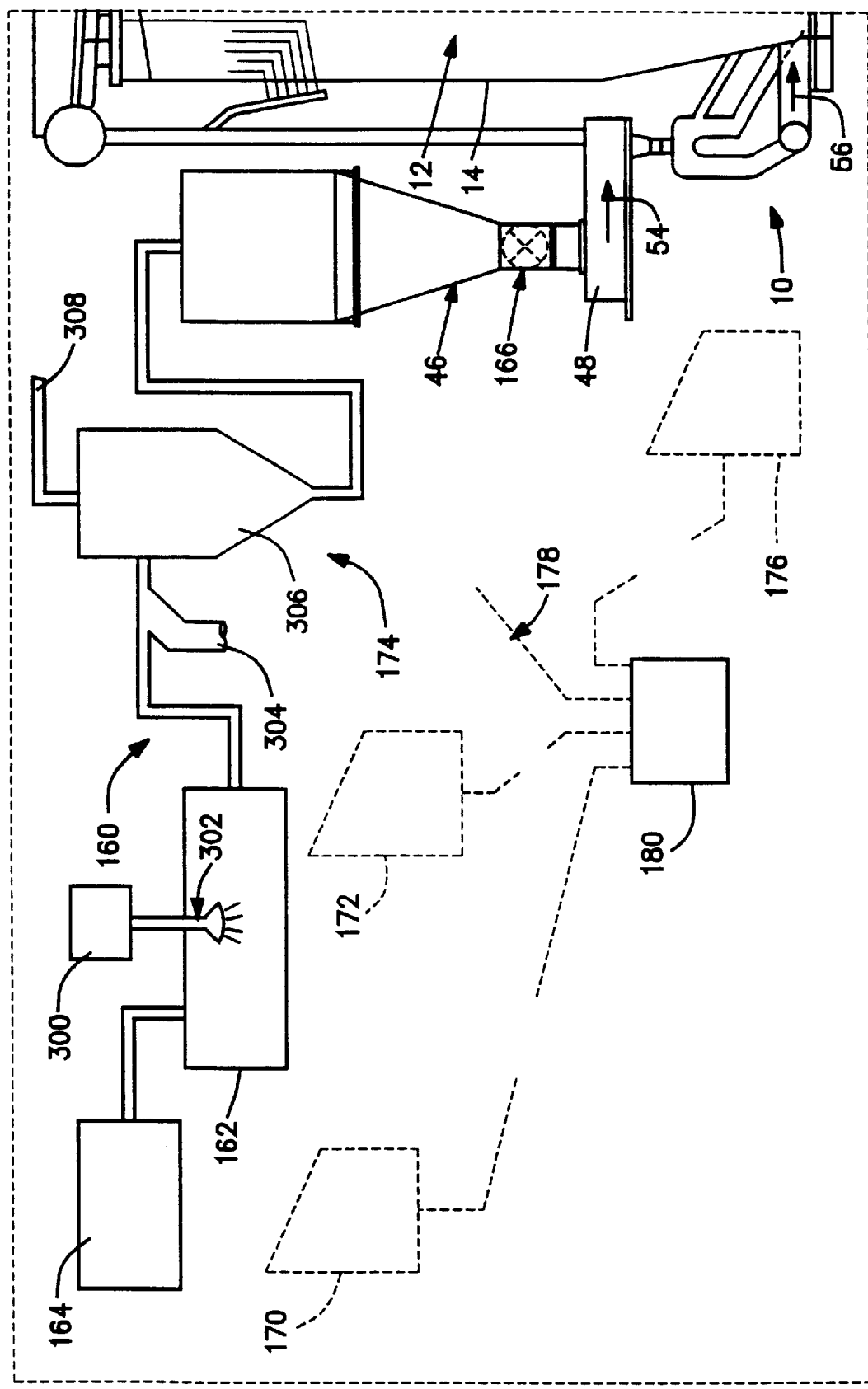
FIG. 4 is a side elevational schematic view of the left hand portion of a circulating fluidized bed boiler shown in FIG. 1 and showing another variation of the sorbent delivery system shown in FIG. 2.

Reference is now had to FIG. 4 which is a schematic elevational view of one modification of the limestone delivery chain illustrated in FIG. 2. In this modification, the station 172 associated with the crusher 162 is configured to provide the pre-treatment application and the station 174 associated with the limestone passage portion 182 between the crusher 162 and the storage silo 46 is configured to provide part or all, as desired, of the post-treatment excess moisture reduction. Thus, the station 172 includes an appropriate wet applicator for applying the inventive aqueous solution to the raw limestone or dolomite delivered to the crusher 162 for crushing thereat. As seen in FIG. 4, an exemplary wet applicator comprises an aqueous solution holding tank 300 fluidly communicated with a spray unit 302 for a controlled spray delivery of an aqueous solution stored in the holding tank 300 onto the limestone in the crusher 162. The aqueous solution is applied under flow conditions sufficient to ensure such contact of the aqueous solution with the limestone as to achieve a desired saturation of the limestone particles.

The crushed limestone particles exiting the crusher 162 for transport to the storage silo 46 may have excess moisture due to the spray application of the aqueous solution to them in at the station 172 associated with the crusher 162. Thus, the station 174 is configured to at least reduce or, if desired, completely eliminate, the excess moisture content of the now pre-treated limestone before the limestone is deposited in the storage silo 46. As schematically shown in FIG. 4, the station 174 includes a hot air duct 304 communicated with a hot air source (not shown) which may be, for example, a self standing fan with heater coils or a fan operable to propel process heat such as so-called boiler blow down heated air into the duct 304. The outlet of the duct 304 is communicated with the transport path of the crushed limestone being advanced to the storage silo 46 such that the crushed limestone is subjected to heating by the hot air flowing from the duct 304. A gas-fluids separator, which may be in the form of, for example, a cyclone separator (hereinafter designated as the cyclone separator 306) is located downstream of the outlet of the duct 304 and upstream of the storage silo 46 for separating the now drier crushed limestone particles and the heated air. The limestone particles exit the cyclone separator 306 to travel thereafter into the storage silo 46 while the heated air which has been separated out exits the cyclone separator via an exit duct 308 for subsequent recycling to the duct 304 or for other thermodynamic use.

Figure 5:
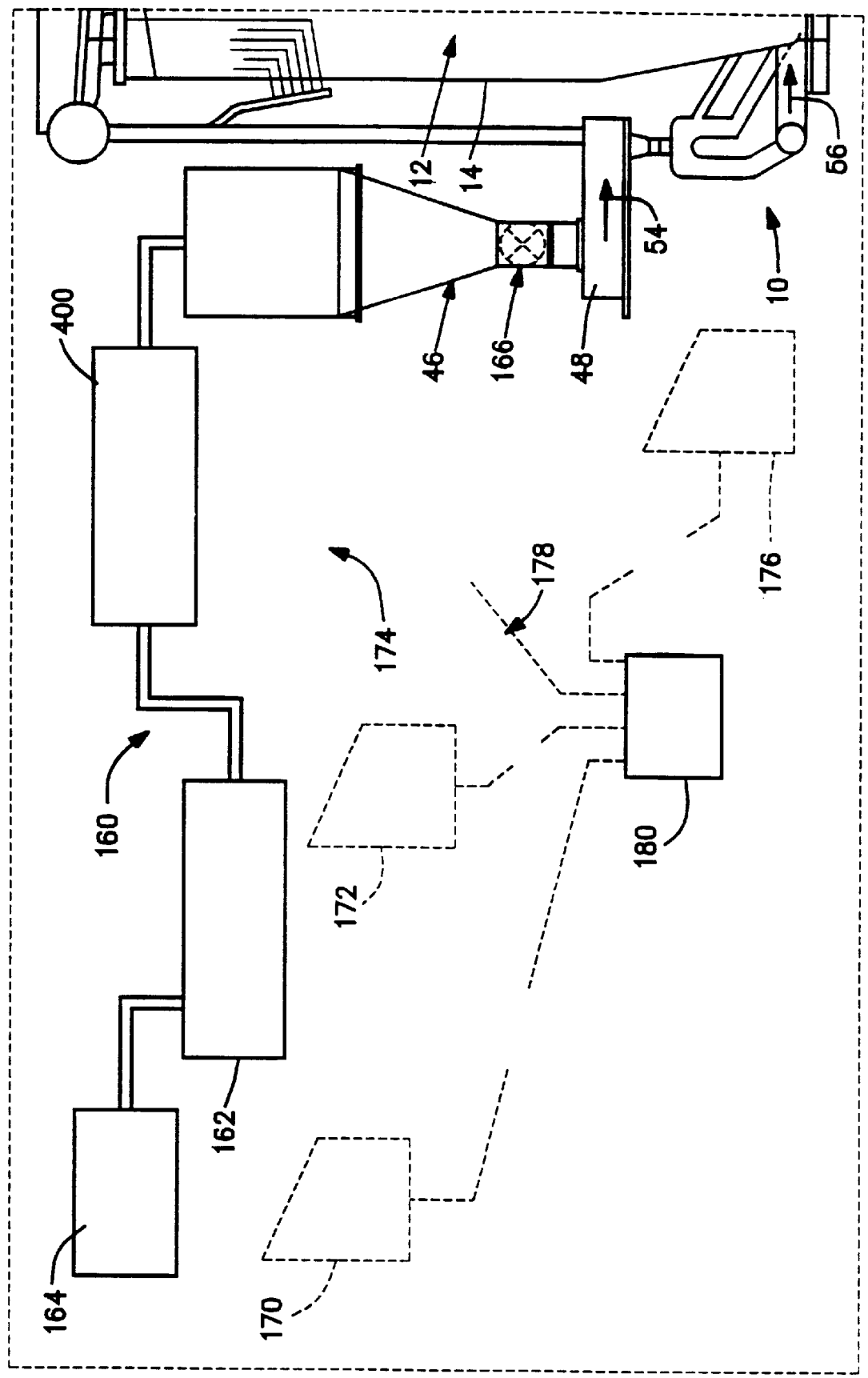
FIG. 5 is a side elevational schematic view of the left hand portion of a circulating fluidized bed boiler shown in FIG. 1 and showing a further variation of the sorbent delivery system shown in FIG. 2.

FIG. 5 schematically illustrates an alternative configuration of the station 174 for performing its excess moisture removal function in lieu of the heated air-cyclone separator arrangement described with respect to FIG. 4. In this alternative configuration, a drying agent enclosure 400 is provided downstream of the crusher 162 and upstream of the storage silo 46 for contacting the crushed limestone particles which have exited the crusher 162 with a drying agent. The drying agent may be fly ash, spent sorbent bed ash, dry limestone, or other suitable moisture absorbing material which may be heated to assist in drying.

Figure 6:
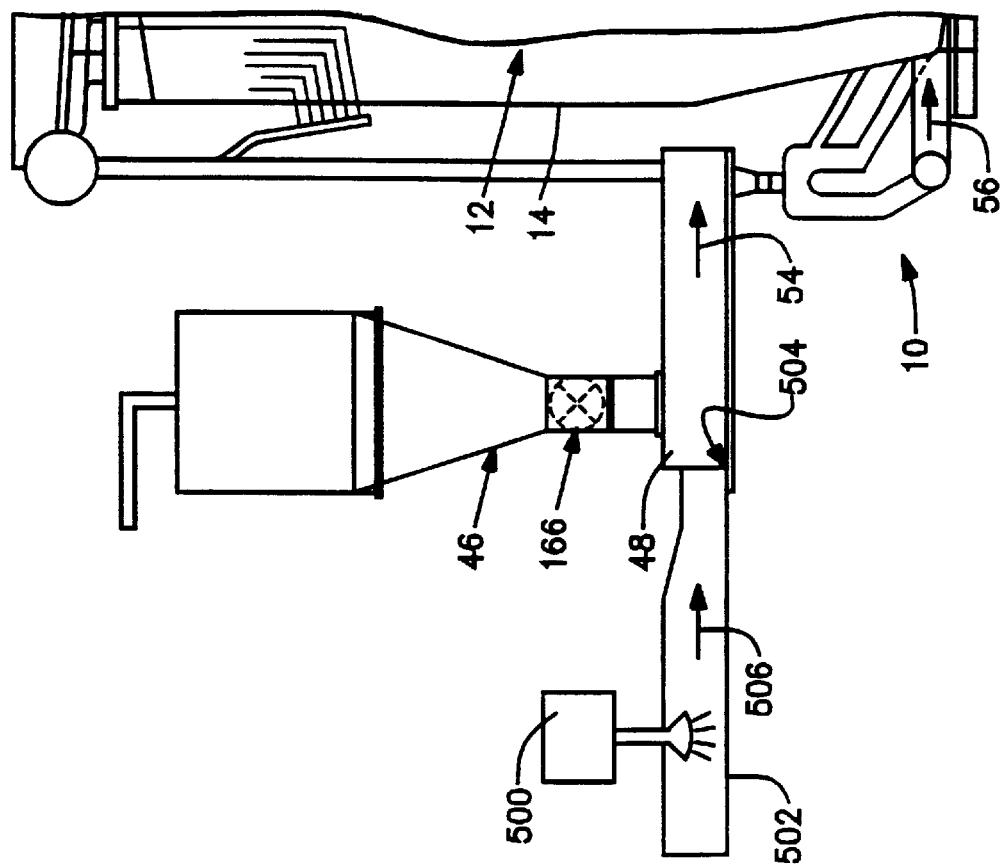
FIG. 6 is a side elevational schematic view of the left hand portion of a circulating fluidized bed boiler shown in FIG. 1 and showing an alternative embodiment of the pre-treatment assembly of the sorbent delivery system.

FIG. 6 schematically illustrates an alternative embodiment of the pre-treatment component which is configured to be operated at the station 176 associated with the supply line 48. A spray unit 500 has a spray head disposed in a transport air introduction duct 502 communicated at an outlet 504 with the supply line 48 and through which heated transport air 506 is introduced into the supply line 48. The spray unit 500 sprays the aqueous solution at a controlled rate in atomized form into the stream of the heated transport air 506 at a location upstream of the location in the supply line 48 at which the heated transport air mixes with the crushed limestone being supplied from the storage silo 46. The aqueous solution entrained with the heated transport air 506 thus mixes with the crushed limestone relatively immediately before the limestone is fed into the generator 10.

Figure 7:
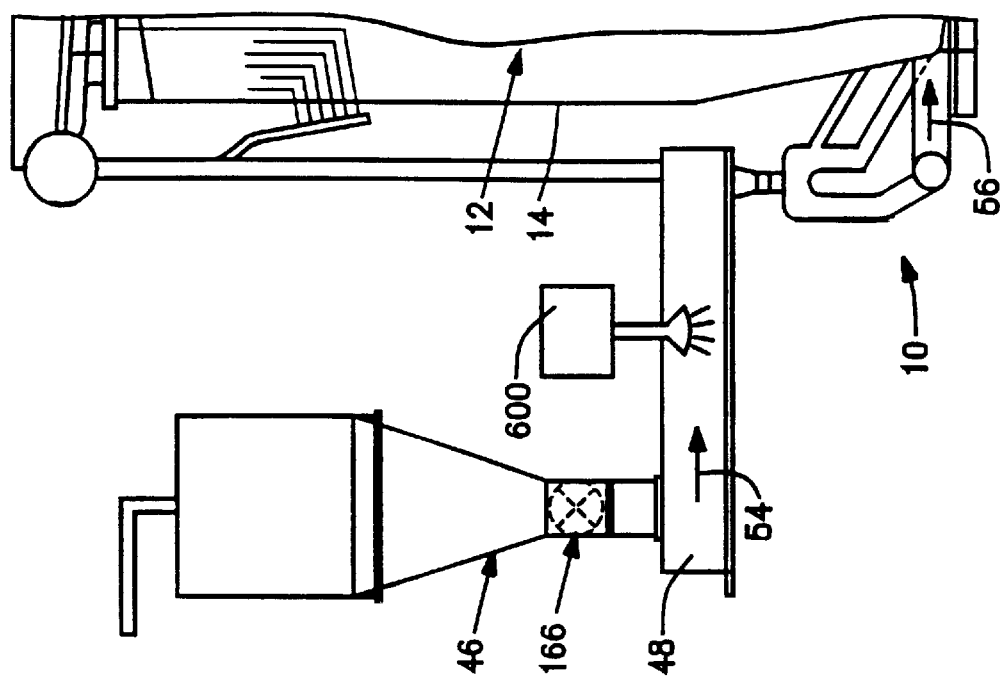
FIG. 7 is a side elevational schematic view of the left hand portion of a circulating fluidized bed boiler shown in FIG. 1 and showing another alternative embodiment of the pre-treatment assembly of the sorbent delivery system.

FIG. 7 schematically illustrates another alternative embodiment of the pre-treatment component which is configured to be operated at the station 176 associated with the supply line 48. A spray unit 600 has a spray head disposed above the stream of crushed limestone being delivered by the supply line 48 from the storage silo 46 to the generator 10 for applying the aqueous solution to the limestone. If no heated transport air is present, the crushed limestone, after wetting thereof by the aqueous solution, enters the generator 10 with excess moisture content which is driven off by the heat within the generator.

The inventive method can also be applied to enhance the reactivity of partially spent alkaline earth material. For example, as has been described with respect to the operation of the generator 10, the remainder of the hot solids 42 which are above predetermined size—namely, the heat exchanger hot solids 44—are diverted from the gas-solids separator 18 to the fluidized bed heat exchanger (FBHE) 36 by way of the heat exchanger inlet 32 and thereafter to the lower segment of the furnace volume 12 via a corresponding heat exchanger outlet 38. An arrangement for applying the inventive aqueous solution to the partially spent heat exchanger hot solids 44 can be configured, for example, as a bath application arrangement such as the tank 200 shown in FIG. 3 or as a spray application arrangement such as the spray unit 300 shown in FIG. 4 for wetting these partially spent limestone particles.

While an embodiment and variations of the present invention have been shown, it will be appreciated that modifications thereof, some of which have been alluded to hereinabove, may still be readily made thereto by those skilled in the art. It is, therefore, intended that the appended claims shall cover the modifications alluded to herein as well as all the other modifications which fall within the true spirit and scope of the present invention.

We claim:

1. A computer controlled process for reducing sulfur in a flue gas, comprising:

providing an aqueous treatment solution containing an inorganic salt and a means for introducing the aqueous treatment solution containing an inorganic salt;

controlling the introducing means in response to a computer program to effect introduction of the aqueous treatment solution into contact with an alkaline earth material; and heating the alkaline earth material in the presence of the flue gas containing $SO_2$ to remove the $SO_2$ from the flue gas.

2. A computer controlled process as claimed in claim 1 wherein the alkaline earth material is limestone.

3. A computer controlled process as claimed in claim 1 wherein the alkaline earth material is dolomite.

4. A computer controlled process as claimed in claim 1 wherein the inorganic salt is selected from a group of thermally decomposable sodium compounds.

5. A computer controlled process as claimed in claim 4 wherein the thermally decomposable group of sodium compounds includes sodium carbonate, sodium bicarbonate, sodium hydroxide, sodium nitrate, and sodium acetate.

6. A computer controlled process as claimed in claim 4 wherein the salt content of the treated alkaline earth material has a concentration of between 0.05 to 5 percent of the inorganic salt.

7. A computer controlled process as claimed in claim 1 wherein the step of providing an alkaline earth material which has been treated by an aqueous treatment solution containing an inorganic salt includes providing an alkaline earth material which has been treated by an aqueous treatment solution containing an inorganic salt during which treatment an effective dispersion of the inorganic salt on the alkaline earth material is accomplished by direct contact between the alkaline earth material and the aqueous treatment solution.

* * * * *